April 28, 1953
C. B. EACRETT
2,636,724
COFFEE BALANCE
Filed March 30, 1950
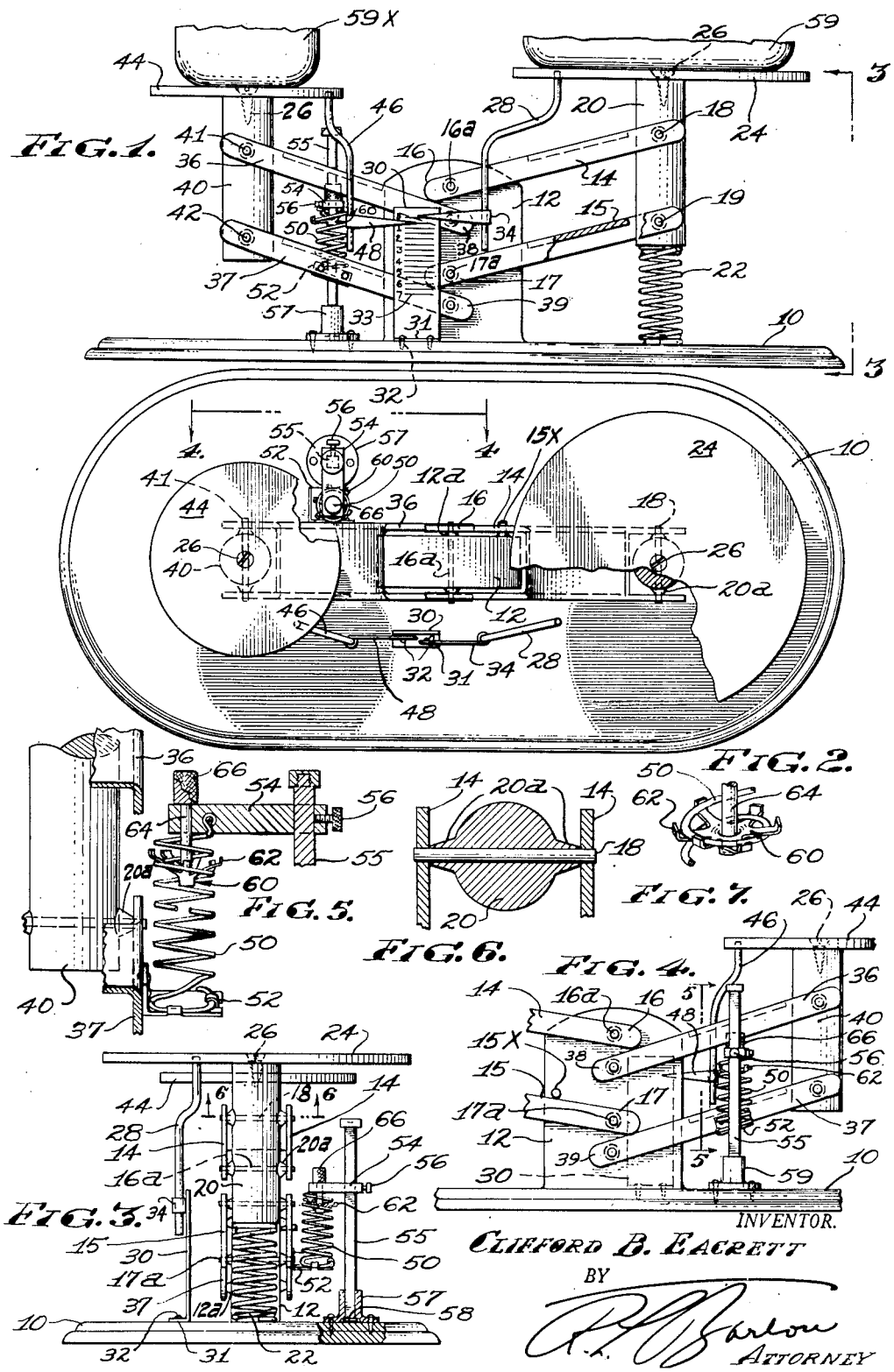
INVENTOR.
*CLIFFORD B. EACRETT*
BY
ATTORNEY Patented Apr. 28, 1953

2,636,724

UNITED STATES PATENT OFFICE 2,636,724

COFFEE BALANCE

Clifford B. Eacrett, Sherman Oaks, Calif.

Application March 30, 1950, Serial No. 152,895

8 Claims. (Cl. 265—63)

My invention relates to devices for proportioning by weight two materials to be mixed together in definite ratios to secure a mixture having definite characteristics desired by the user, the device being adjustable in order that mixtures of different characteristics may be obtained. It will be understood that when the device has been set for selected materials, it will operate to provide the desired mixture any number of times without further setting.

The device is of the kind comprising resiliently supported weighing members maintained horizontal during movement on a base and carrying pointers reading on a scale mounted on the base.

The device will be described hereinafter as applied to the proportioning of coffee and water to provide drinking coffee, but it will be evident that the device is not limited to such use.

In brewing coffee uniformity of successive brews cannot be obtained without careful measuring of the amount of coffee to each cup of water; such carefulness is distasteful to many persons and is therefore very prone not to be exercised.

Different types of coffee require different proportions of coffee to water, and of course the taste of different individuals varies as to the strength of coffee desired, or different strengths of coffee may be desired by the same individual at different times.

It is an object of my invention to provide a proportioning device which may be readily set by trial to thereafter produce a brew of coffee having the strength desired by merely bringing pointers into alinement on a scale marked to indicate the number of cups being made.

It is a further object of my invention to provide a coffee to water proportioning device which, after initial setting, will determine the correct proportion of coffee to water to produce drinking coffee having the strength of the selected mixture, provided the same brand of coffee is used, and to provide means whereby the strength of the mixture may be readily adjusted if required, or if another type of coffee is used.

It is another object of my invention to provide an accurate coffee proportioning device of simple and inexpensive construction which will provide long service without deterioration in accuracy.

A further object of the invention is to provide a coffee proportioning device with primary means for initially setting the relative position of spring supported members, said means not being used for ordinary adjustments, for which other secondary adjustment means are provided.

Still further objects and features of my invention will hereinafter appear from a study of the following description read with reference to the accompanying drawings which illustrate an embodiment of the invention at present deemed preferable by me, but it is to be understood that various changes and modifications may be made in the described embodiment without departing from the scope of the invention as defined by the appended claims.

In the drawings—

Fig. 1 is a front elevation of the measuring or proportioning means of my invention;

Fig. 2 is a plan view of the device shown in Fig. 1;

Fig. 3 is an end elevation, with parts sectioned, looking in the direction of the arrows 3—3 in Fig. 1;

Fig. 4 is a fragmentary rear elevation looking in the direction of the arrows 4—4 in Fig. 2;

Fig. 5 is a fragmentary cross section on the line 5—5 of Fig. 4, and drawn on a larger scale;

Fig. 6 is a fragmentary cross section on the line 6—6 of Fig. 3, and drawn on a larger scale; and Fig. 7 is a detail view in perspective of a member effective to adjust the tension of the spring shown in Fig. 5.

In the drawings the numeral 10 indicates a base on which is secured a centrally located pedestal 12. A pair of bifurcated arms 14, 15 of equal length are each pivoted at one end at 16, 17, respectively, to said pedestal 12, as for instance on the ends of shafts 16a, 17a in Fig. 3 extending through the pedestal.

At their opposite ends the arms 14, 15 are pivotally secured by means of pivot shafts 18, 19 to a vertical stem 20, the lower end of which is spaced from the base by a compression coil spring 22 positioned between the lower end of the stem 20 and the base 10, and retained in position in any suitable way with respect to both the stem and the base.

A container supporting plate 24 is secured horizontally to the upper end of the stem 20, as for instance by a screw 26.

A stop 15x may be provided on the pedestal 12 which serves to limit the upward movement of arm 15 and thereby determines the raised position of plate 24.

An indicator mount in the form of a rod 28 is secured at its upper end to plate 24 and is bent so as to extend vertically alongside a metal plate 30 mounted vertically on the base 10, as by a flange 31, secured to the base by screws 32.

The metal plate 30 is marked on its face, as indicated at 33 with a scale to show cups of coffee and fractions thereof of a standard size.

A pointer 34 is slidably mounted on rod 28 and projects over one side of scale 33 in close proximity thereto. The pointer is frictionally held in any position to which it may be adjusted on rod 28.

A second pair of bifurcated arms 36, 37 are each pivoted at one end to the pedestal 12 as indicated at 38, 39, respectively, on the projecting ends of shafts similar to shafts 16a, 17a, extending through the pedestal 12. The opposite ends of the arms 36, 37 are pivoted to a stem 40 as indicated at 41, 42 in a similar manner to arms 14, 15.

To provide rigid yet light construction of arms 14, 15, 36 and 37 I prefer to form each arm from a wide strip of metal with bent up side flanges, the web being of course cut away to clear the support 12 and the stems 29 and 40. By this construction distortion of the arms is prevented.

A second container supporting plate 44 is secured horizontally to the upper end of stem 40. An indicator mount formed as a length of rod 46 is secured at one end to plate 44 and is bent to extend alongside the metal plate 30 on the opposite side thereof to rod 28.

A pointer 48 is slidably mounted on rod 46 and projects over the side of scale 33 opposite to that traversed by pointer 34. The pointer 48 is held frictionally in any position to which it may be adjusted on rod 46.

It will be noted that since the arms of each pair of arms is parallel, and are pivoted to the stems 29 and 40 on lines parallel to one another, while both pairs of arms are pivoted to pedestal 12 on a common line also parallel to the lines on which the arms are connected to the stems 29 and 40, the plates 24 and 44 will always remain horizontal, but may move vertically relatively to each other.

Resilient means are provided for resisting downward movement of stem 40 and plate 44 and adjustment of the resistance of said resilient means by the user is provided for. The resilient means comprise a tension coil spring 50 of less resistance than spring 22 and secured at its lower end to a bracket 52 riveted or otherwise attached to lower arm 37. The upper end of the spring 50 is secured to an arm 54, provided with a square opening slidably fitting on a square section stem or post 55 and adjustably secured thereon by a set screw 56. Stem 55 is mounted vertically in a socket member 57 secured to the base 10 and is provided with a head 58 fitting in an undercut in the socket member and preventing axial movement of the stem 55.

A container 59 for water is placed on plate 24 and a container 59x for coffee is placed on plate 44.

Springs 22 and 50 are of such strength that spring 22 deflects as much under the weight of one cup of water as spring 50 deflects under the usual weight of the amount of coffee added to one cup of coffee in making a drink of coffee.

Before tightening set screw 56, arm 54 may be slid up or down the square section stem although held against rotation thereon thus setting the lower end of the stem 40 relatively to part 10. This adjustment is made when initially setting the device at the factory for use in preparing coffee of average strength from a standard type of coffee.

A means of varying the resistance of spring 50 is also provided for the user to adjust the device to secure a coffee to water ratio which will make a brew to his particular liking, and is best shown in Fig. 5 and is now described.

Engaging with the top coils of spring 50 is a spider 60. Some of the arms 62 of the spider extend above and some below the wire of the coils but enable the spider to be rotated on the wire. A shaft or stem 64 having an enlarged knurled head 66 is mounted in a hole drilled in arm 54 and is rigidly secured to the spider. Rotating stem 64 in a clockwise direction causes the spider to add more active coils to the spring, lessening the tension in the spring and permitting it to yield to a greater degree for an equal weight of coffee and therefore requires that a greater amount of water be added to bring the water container supporting stem and its associated indicator opposite the indicator of the coffee supporting stem, thus enabling the user to secure a weaker brew. Turning the stem counterclockwise has the reverse effect and results in a stronger brew. It will be seen that said spider is an inter-coil vertically adjustable member which may be positioned to underlie a longer or shorter part of the upper end portion of the spring.

Referring to certain details of construction, integral, tapered bosses 12a projecting laterally from the pedestal 12 and like bosses 29a on the stems 29 and 40 cooperate with adjacent moving parts to reduce friction.

Operation

First, the water container 59 is placed empty on plate 24. The weight of the container will compress spring 22 thus lowering the pointer 34. It will be noted that the scale reads from zero at the top and is graduated downwardly in numbers of cups or fractions thereof; this graduation has been previously carried out at the factory by placing weights, equal to the weight of a various number of average sized cups of water, on the plate.

The pointer 34 is then slid up rod 28 to the zero mark, the weight of the water container being thus compensated for.

It is proposed to furnish with the device a ground coffee container of measuring cup size, which holds enough coffee to brew about twelve cups of average strength coffee. This container indicated at 59x is placed empty on plate 44 and its weight is compensated for by following out a similar procedure with pointer 48 as was carried out with pointer 34, both pointers will then be against the zero mark "0" on scale 33 with both empty containers in place.

Water is then poured into the water container until pointer 34 is opposite to the number of cups desired to be brewed as shown on scale 33. Ground coffee is then poured into the coffee container until pointer 48 is in alinement with pointer 34. The water and coffee containers are then removed and the contents are poured into the appropriate coffee making utensil, or the water is first brought to the boiling point before adding it to the utensil and the mixture is brewed.

If the user likes coffee stronger than the average, he turns the head 66 of stem 64 counterclockwise sufficiently to make the desired test and brews some coffee, repeating this testing process until he secures the right strength of brew. The adjustment will be the converse of that described should a weaker solution of coffee be required.

After securing the desired strength of brew by trial, it will not be necessary to again change the adjustment no matter whether only one cup or several cups are desired.

I claim:

1. A coffee and water proportioning device, comprising: a base; a pedestal mounted on said base; a pair of stems; container supporting plates secured to said stems, one of which is adapted to support a container for water and the other of which is adapted to support a container for ground coffee; two pairs of parallel spaced arms of equal length, one pair of being pivoted at one end to the pedestal and at the other end to one stem, and the other pair being pivoted at one end to the pedestal and at the other end to the other stem, the arms being effective to constrain the stems in vertical position during movement; a coil compression spring arranged between the stem supporting the water container and the base; a vertical stem projecting upwardly from the base and having a laterally projecting arm; a tension spring having its upper end secured to said arm and its lower end secured to a part connected to yieldably hold the ground coffee container supporting stem above the base; pointer supporting means secured to each container supporting plate; pointers frictionally held on said pointer supporting means and adjustable thereon; a vertical scale on said pedestal having a zero mark, against which said pointers are set for the purpose described, said scale being marked downwardly in cups of coffee; adjustment means for said tension spring, comprising: a rotatable stem mounted vertically in said arm to extend into the turns of said tension spring and held against downward movement therein; and a spider rigidly secured to said stem to extend across said second coil spring and provided with parts engaging slidably with a coil of said spring whereby rotation of said stem in one direction is effective to draw coils of the spring from below to above said spider to stiffen the spring, and rotation of the stem in the opposite direction is effective to feed coils from above to below the spider to weaken said spring.

2. A device of the kind described for proportioning two materials of different weight to be mixed in a selected proportion, comprising: resilient means yieldably supporting a quantity of one material; a vertical stem and an arm projecting laterally therefrom and slidably adjustable thereon; means for clamping said arm in adjusted position on said stem; a coiled tension spring secured at its upper end to said laterally projecting arm; a second material supporting means, said coiled spring being secured at its lower end to said second material supporting means; and a rotatable stem mounted vertically in said arm to extend into the turns of said tension spring and held against downward movement in the arm; a spider rigidly secured to said stem to extend across said coiled spring and provided with parts engaging slidably with a coil of said coiled spring whereby rotation of said stem in one direction is effective to draw coils of the spring from below to above said spider to stiffen the spring, and rotation of the stem in the opposite direction is effective to feed coils from above to below the spider to weaken said spring.

3. A coffee and water proportioning device comprising a base; a pedestal mounted on said base; a pair of stems; container supporting plates secured to said stems, one of which is adapted to support a container for water and the other of which is adapted to support a container for ground coffee; two pairs of parallel spaced arms of equal length, one pair being pivoted at one end to the pedestal and at the other end to one stem, and the other pair being pivoted at one end to the pedestal and at the other end to the other stem, the arms being effective to constrain the stems in vertical position during movement; a coil compression spring arranged between the stem supporting the water container and the base; a vertical stem projecting upwardly from the base and having a laterally projecting arm; a tension spring having its upper end secured to said arm and its lower end secured to a part connected to yieldably hold the ground coffee container supporting stem above the base; pointer supporting means secured to each container supporting plate; pointers frictionally held on said pointer supporting means and adjustable thereon; a vertical scale on said pedestal having a zero mark opposite which said pointers are set for the purpose described, said scale being marked downwardly in cups of coffee to be brewed; a vertically adjustable stem carried by said arm and extending downwardly therefrom; and a member carried by the downwardly extending portion of said stem and adjustable by means of the latter to underlie a longer or shorter part of the upper end portion of said tension spring, thus to vary the supporting force thereof in relation to said ground coffee container.

4. A coffee and water proportioning device comprising, mounting means, a coiled compression spring mounted thereon, a carrier plate for a water container supported from below by said compression spring, a vertically extending elongated coiled tension spring pendantly supported by said mounting means, a carrier plate for a coffee container, a vertically movable stem secured to and extending downwardly from the latter carrier plate, means operatively connecting said stem from below with the lower end of said tension spring, spring tensioning means carried by said mounting means in engagement with the upper end portion of said pendant spring and adjustable to vary the number of coils of the spring above and below said tensioning means, only the coils of the spring which are below said tensioning means being effective to oppose downward traction applied to the lower end of the spring by the weight of the coffee, and indicating means indicating the extent to which said water container and carrier plate are depressed by their loads in opposition to said springs, said indicating means comprising pointers connected to said plates to move up and down with them, and a graduated scale carried by said base in a co-operative relation to said pointers.

5. A base, a first elongated coiled spring upstanding from said base, a support resting upon the upper end of said spring, a container mounted upon said support to move up and down therewith in opposition to the compressive action of said spring in accordance with the weight of material deposited in said container, a post upstanding from said base, a horizontally extending arm having one end attached to said post, a second elongated coiled spring pendantly suspended in an endwise manner from said arm, a second support and container carried by said second spring, said second support being connected to the lower end of said second coiled spring, pointers operatively connected to and movable up and down with said first and second supports, and a graduated scale carried by said base in a position to co-operate with both of said pointers.

6. The subject matter of claim 5 and adjustable means connected with the coils of said second spring to render inoperative a varying number of the coils of the spring, thus to vary the resisting power thereof.

7. A device of the kind described comprising a base, a first and second vertically movable support for two materials subsequently to be blended to make a brew, a spring carried by said base in a position to oppose downward movement of said first support, a spring mediately carried by said base in a position to oppose downward movement of said second support, indicating means in two co-operating parts, one carried by said supports and the other by said base to indicate the extent to which each of said supports is moved downwardly by material placed on it, and means to regulate the amount of opposition to the depression of said second support by the spring associated therewith to determine the strength of the brew.

8. A device of the kind described comprising a base, a first and a second vertically movable support for two materials subsequently to be blended, a pointer mediately connected with said first support, a pointer mediately connected with said second support, an indicating scale carried by said base in a co-operative relation to said pointers, a compression spring interposed between said base and said first support, a stem upstanding from said base, a vertically adjustable arm carried by said stem and projecting laterally therefrom, a tension coil spring depending from said arm, means carried by said arm to adjust the tensional resistance of said coil spring, and vertically movable means attached to the lower end of said tension spring and connected with said second support to oppose downward movement of the latter.

CLIFFORD B. EACRETT.

References Cited in the file of this patent

UNITED STATES PATENTS

| Number | Name | Date |
|---|---|---|
| 478,699 | Kovsky | July 12, 1892 |
| 519,593 | Seaberg | May 8, 1894 |
| 628,478 | Kuhne | July 11, 1899 |
| 1,382,699 | Weber | June 28, 1921 |

FOREIGN PATENTS

| Number | Country | Date |
|---|---|---|
| 2,186 | Great Britain | 1863 |
| 13,338 | Great Britain | 1886 |